United States Patent [19]
Kay et al.

[11] Patent Number: 5,343,513
[45] Date of Patent: Aug. 30, 1994

[54] CHANNEL COMPRESSION AND DYNAMIC REPARTITIONING FOR DUAL MODE CELLULAR RADIO

[75] Inventors: Stanley E. Kay, Rockville; George D. Farmer, Frederick; Hans Bhatia, Germantown; Ashok D. Mehta, North Potomac; Christopher J. Kain, Damascus; Nicholas P. Sampson, Clarksburg, all of Md.

[73] Assignee: Hughes Aircraft Company, Los Angeles, Calif.

[21] Appl. No.: 870,976

[22] Filed: Apr. 20, 1992

[51] Int. Cl.⁵ .............. H04M 11/00; H04Q 7/00; H04J 3/16
[52] U.S. Cl. ...................... 379/59; 455/33.1; 455/34.1; 370/95.1; 370/95.3
[58] Field of Search ............ 379/59; 455/33.1, 34.1; 375/5, 7, 8; 370/95.1, 95.3

[56] References Cited

U.S. PATENT DOCUMENTS

| | | | |
|---|---|---|---|
| 4,870,696 | 9/1989 | Yorita | 379/59 |
| 4,949,395 | 8/1990 | Rydbeck | 370/95.3 |
| 5,107,494 | 4/1992 | Johnson et al. | 370/95.1 |
| 5,121,391 | 6/1992 | Paneth et al. | 370/95.1 |
| 5,128,928 | 7/1992 | Wilder et al. | 370/110.2 |
| 5,146,609 | 9/1992 | Tayloe et al. | 455/54.2 |
| 5,150,361 | 9/1992 | Wieczorek et al. | 370/95.1 |
| 5,157,661 | 10/1992 | Kanai et al. | 370/95.1 |
| 5,159,593 | 10/1992 | D'Amico et al. | 370/95.3 |
| 5,182,753 | 1/1993 | Dahlin et al. | 370/60 |
| 5,184,347 | 2/1993 | Farwell et al. | 370/95.1 |

*Primary Examiner*—Stephen Chin
*Assistant Examiner*—Vijay Shankar
*Attorney, Agent, or Firm*—Gordon R. Lindeen, III; William J. Streeter; Wanda K. Denson-Low

[57] ABSTRACT

A cellular system uses dynamic repartitioning and channel packing to improve capacity without impacting quality. Dynamic repartitioning is employed to convert a carrier which operates, at one time, as an analog carrier to operate, at a later time, as a digital carrier in response to changes in offered traffic. Alternatively, a carrier which, at one time, operates as a digital carrier is converted to operate, at a later time, as an analog carrier in response to changes in offered traffic. Channel packing is used to allocate as many digital channels as possible to as few digital carriers as possible. In a preferred embodiment, both repartitioning and channel packing are implemented in response to call origination or call termination.

29 Claims, 5 Drawing Sheets

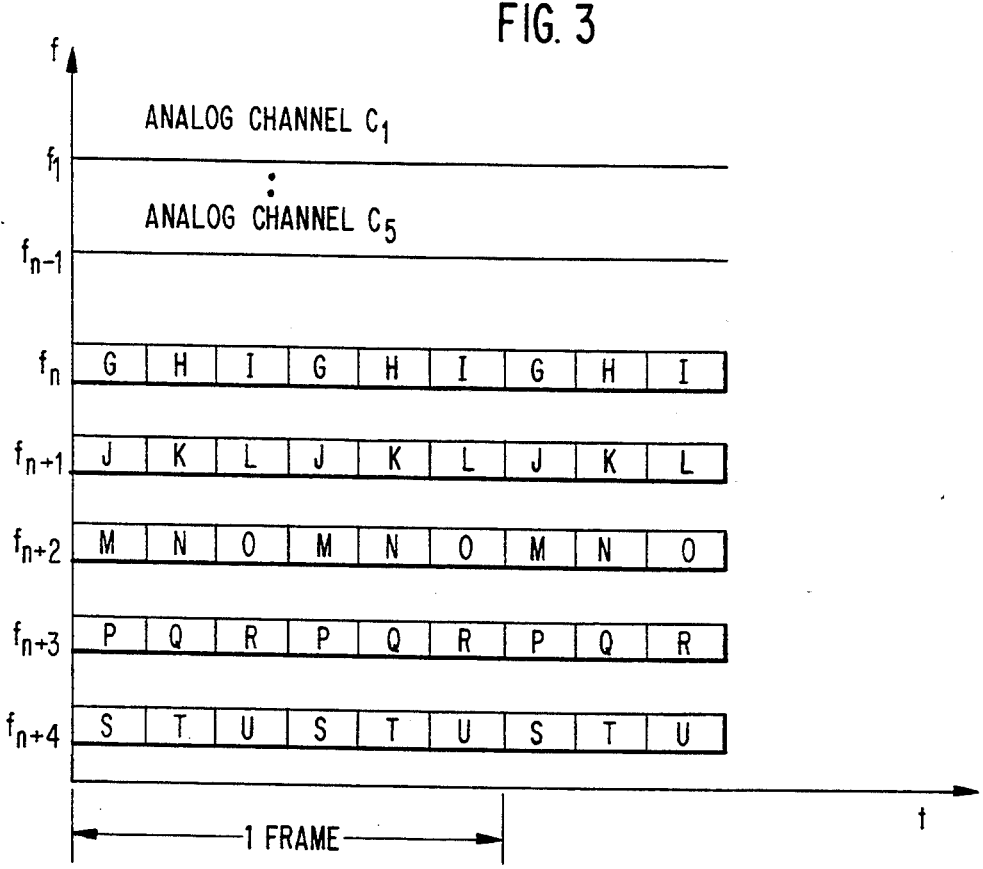

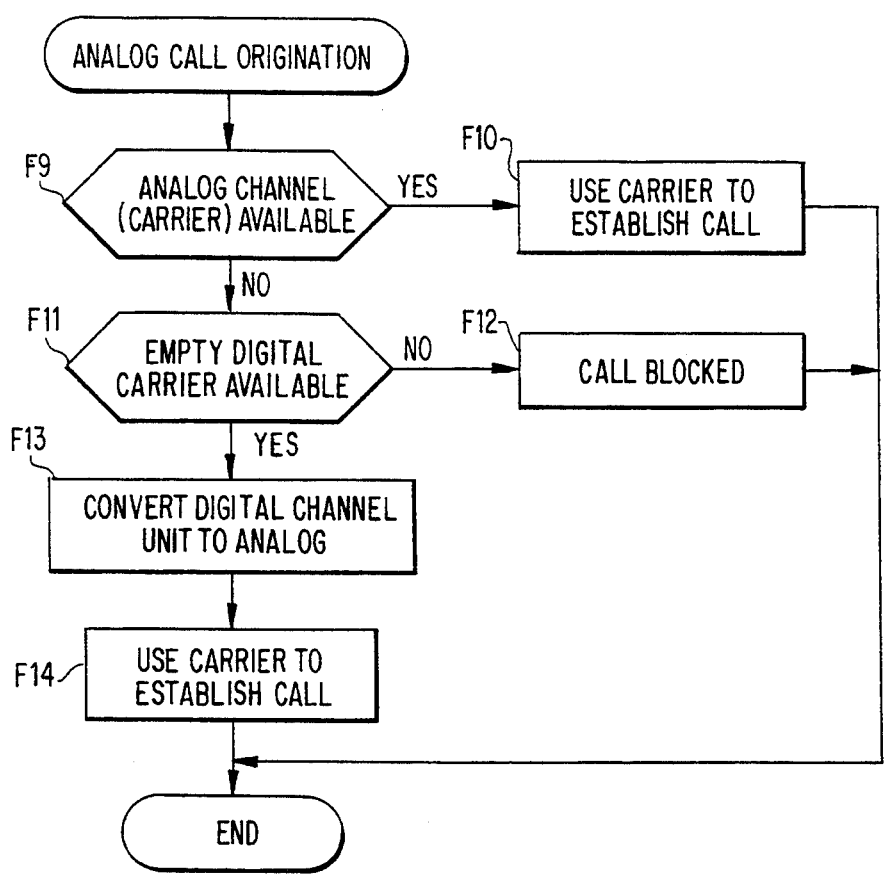
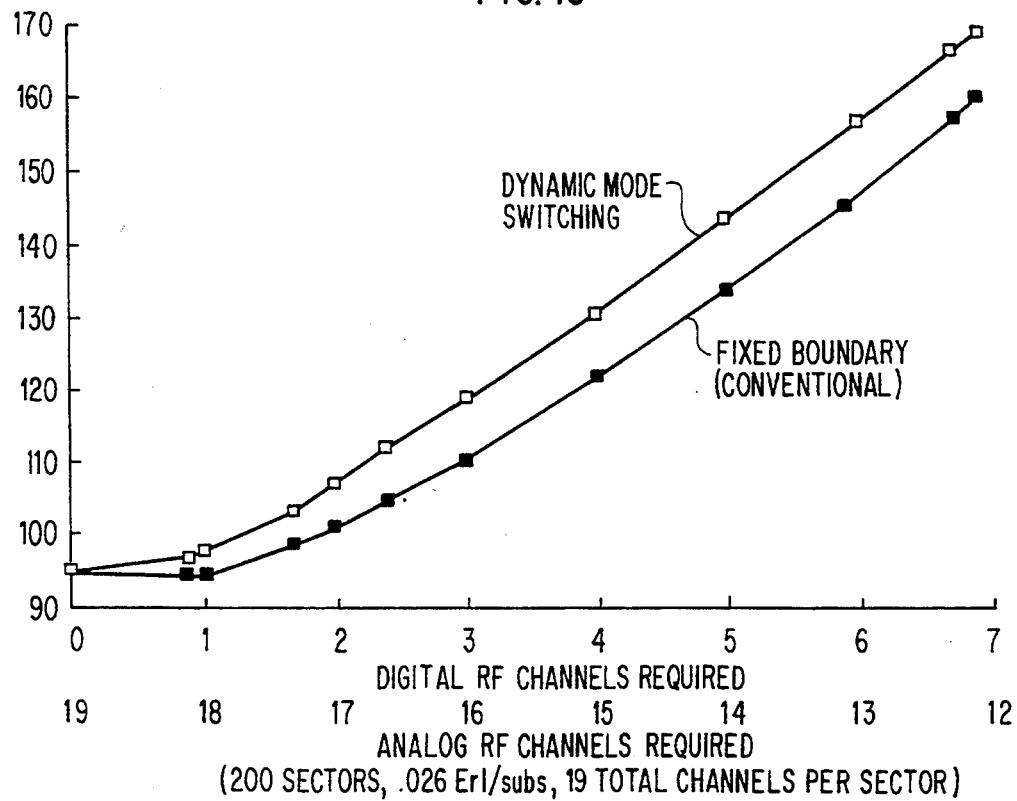

CHANNEL COMPRESSION AND DYNAMIC REPARTITIONING FOR DUAL MODE CELLULAR RADIO

DESCRIPTION

1. Technical Field

The present invention relates to improvements in dual mode cellular telephony.

2. Background Art

The interim TIA standard IS-54 entitled "Cellular System Dual-Mode Mobile Station-Base Station Compatibility Standard" requires that the fixed component of the cellular telephone system be capable of handling mobile stations operating in an analog mode as well as mobile stations operating in a digital mode. The analog mode is at least similar to the Advanced Mobile Phone Service (AMPS) system which has been in operation in the United States for about 10 years. In the digital mode, Time Division Multiple Access is employed wherein, on a given carrier, time is segmented into frames and frames are further segmented into slots. A user may have exclusive use of one or more slots per frame. A voice channel is either two slots per frame (full rate coding) or one slot per frame (half rate coding). By this technique, several voice channels can occupy a given carrier.

Since in the analog mode a carrier can only support one user at a time whereas in the digital mode a carrier can support multiple users, the digital mode enjoys a traffic carrying advantage over the analog mode.

In order to comply with the standard, a given base station will usually support a mix of carriers operating in an analog mode (analog carriers) and other carriers operating in a digital mode (hereinafter, digital carriers). The cellular concept dictates that any base station have access at any given time to a predetermined number of carriers to handle the traffic. The goal of any rational system is to maximize its capacity without degrading the quality of service. The factors impacting this variable are the reuse factor, the propagation environment, the antennas, the distribution of mobiles and the activity level of the channels. For a given reuse, propagation, antenna pattern and mobile distribution, the Carrier to Interface Ratio (CIR) only depends on the activity level of the interfering carriers. Under these circumstances, if the parameters dictate failure to meet a CIR threshold, then the activity left with the carriers must be reduced until the performance goal is met. For an explanation of the concept of reuse and the relationship between reuse and CIR, see the BSTJ, January 1979. In respect of the propagation environment, see Chapter 2 of Microwave Mobile Communications by Jakes, Jr., ED.

The cellular model is a hexagonal grid with cell sites located at the center of each hexagon or at the vertices. Certain cells use the same frequency sets as other cells. This is called frequency reuse. In addition, cells may use directional antennas to limit interference, this is called sectorization. Popular configurations are seven cell, three sector and four cell and six sector. The capacity advantage achieved by frequency reuse is not without cost since it leads to co-channel interference. The CIR is found by computing the ratio of the desired signal power received by a mobile to all of the co-channel interference received by that mobile.

To the extent that a digital carrier supports a full complement of active voice channels, the interference generated by that digital carrier is justified. However, the standard requires that if any channel on the digital carrier is active, then the digital carrier must exist not only for the active channel but for the remaining complement of vacant channels on that digital carrier. Consequently, the interference generated by that digital carrier during the portion of the frame in which no voice or data traffic is being transmitted is, at least in some senses, unnecessary.

These particular factors raise at least two problems. A first problem is the appropriate mix of analog and digital carriers to be employed. While the dual use standard provides some flexibility in that a dual mode mobile can operate either with an analog carrier or with a digital carrier, there is an irreducible requirement that analog mobiles should receive service to the extent that there are available channels. If some a priori partitioning between analog and digital channels leaves some unused digital channels, then an analog mobile may be denied service even though there is bandwidth available because that bandwidth had been dedicated to the digital mode.

A second problem relates to the distribution of digital traffic on the digital carriers. Because the carrier can support multiple channels, and because the time at which a channel becomes vacant or inactive cannot be predicted, it is certainly conceivable that there will be multiple digital channels each operating at less than capacity.

For example, if three digital carriers each operate at two-thirds of capacity, then there is the equivalent of a full digital carrier operating vacant. That condition generates unnecessary interference.

SUMMARY OF THE INVENTION

The invention overcomes the foregoing problems by employing dynamic repartitioning of the available spectrum space as well as channel compression.

In accordance with the invention, at least some of the spectrum allocated to a cell site is subdivided into a pool of carriers operating as analog carriers and a separate pool of carriers operating as digital carriers. Call originations requiring an analog carrier are initially satisfied from carriers available in the pool of analog carriers. Likewise, call originations which are capable of employing digital carriers are initially directed to the pool of digital carriers for support. In order to avoid the problems raised by a priori determination of analog and digital partitioning, the invention allows for changing the character of a particular carrier from digital to analog or analog to digital in response to real time demands of the traffic. Furthermore, the distribution of digital traffic on the digital carriers is examined and that distribution is altered so that the channels can be repacked in order to minimize the number of vacant digital channels which exist on operating or active carriers.

Channel packing or compression implies that a connection will be moved from one channel to another. This operation takes place in conventional cellular telephony when a mobile is moving from the coverage of one cell to another, i.e. it is a handoff. However, in accordance with the present invention, the connection is being moved from one channel to another even though the mobile has not moved from one cell to another, i.e. it is an intracell handoff.

There are three performance goals that can be identified:

(1) Assure that the minimum number of RF channels are being used at call origination times so that the dynamic mode switching can work as well as possible, (2) Minimize system interference by assuring that the minimum number of RF channels are being used at any time, (3) Minimize the voice quality impairments caused by handoffs.

To achieve the first and second goals, we can pack digital channels at every digital call termination. This procedure precludes ever having to pack channels at call origination time. The third goal is of course best satisfied by never packing any channels by intracell handoff. Since goal 3 is fundamentally incompatible with goals 1 and 2, we observe that intracell handoffs can be made to affect very few speech frames, particularly when the digital carriers in a cell are mutually synchronized.

An intracell handoff is accomplished by telling the mobile to tune to a new carrier frequency and to use a particular (new) channel on that carrier. In the forward direction, the speech information is sent to both the old and new channel units so the exact time at which the mobile retunes does not affect the speech quality it receives, i.e. the base does not need to know exactly when the mobile retunes. In the reverse direction the base station recognizes that the mobile station is tuned to the new frequency when the mobile station's transmission is detected on the new channel unit. At that time, the base station begins providing voice data to the MSC from the new channel and the channel unit handling the old channel ceases to do so. This entire process can be accomplished between time slots used by the mobile station. The process will lose one speech frame which is masked by repeating the previous speech frame. The process will be virtually unnoticed by the mobile station. Consequently, the intracell handoff can be performed as often as desired to control frequency interference and to maximize capacity.

The preceding description has assumed that the mobile can switch from one RF channel to another in the time it takes to retune its frequency synthesizer. This is predicated on the assumption that the frames on every carrier are mutually synchronized. If this is not the case, then some additional time will be needed for the synchronization process.

An enhancement of the standard IS-54 is the method and apparatus described in co-pending application Ser. No. 622,232, filed Dec. 6, 1990, and assigned to the assignee of this application. which differs from IS-54 by using digital speech interpolation. In other words, a channel is only assigned for the duration of a speech spurt and not for the duration of a conversation. Consequently, an intracell handoff can occur when no speech is active in either direction. A voice activity detection identifies when speech is active on the voice channels and thus an intracell handoff can be coordinated with this information, in other words, the intracell handoff occurs when the mobile is neither transmitting nor receiving voice traffic.

Accordingly, the invention provides a method of operating a given cell in a cellular telephone system to improve capacity and reduce interference, where the method comprises:

(a) at a first time, establishing for a set of n radio frequency carriers available within the given cell, a first subset $n(a1)$ of carriers operating as analog carriers and a second subset $n(d1)$ of carriers operating as digital carriers, where each digital carrier supports from 1 to x channels on a time multiplex basis, where:

$n(a\#)$ represents the number of analog carriers at a time identified by the index #, $n(d\#)$ represents the number of digital carriers at a time identified by the index #, n represents the number of carriers at the cell, n, $n(a\#)$ and $n(d\#)$ are each integers, a sum of $n(a\#)$ and $n(d\#)$ is less than or equal to n, and x is an integer greater than or equal to 2, (b) at a second time later than said first:

(b1) examining each of the digital carriers to locate those digital carriers supporting less than x channels, (b2) selecting channels from among a group of the digital carriers located in step b1) and rearranging the selected channels to occupy unused channels of digital carriers located in step (b1) which are not within the digital carrier group, and (c) at a third time, later than the first time, selecting at least one digital-carrier supporting no channels and removing said selected digital carrier from the second subset of carriers operating as digital carriers and inserting the removed carrier into the first subset of carriers operating as analog carriers so that at the third time, later than the first time, the first subset of carriers $n(a3)$ is greater than the first subset of carriers $n(a1)$ at the first time.

Conversely, rather than removing a digital carrier from the digital carrier pool and inserting it into the analog carrier pool, traffic demands may require that an analog carrier be removed from the analog carrier pool and inserted into the digital carrier pool.

In accordance with the invention, each of the digital carriers which supports at least a single channel does so by means of a time multiplex frame structure in which each channel appears as at least one time slot within each frame, where the time slots of a given channel are distinct from the time slots of other channels of that digital carrier. In this environment, the frame structure of each of the digital carriers is synchronized so that a channel of one digital carrier is synchronous with the channel of some other digital carrier. By this technique then, the intracell handoff does not require resynchronization inasmuch as all the channels are synchronized.

In accordance with another aspect, the invention provides a method of operating a given cell of a cellular telephone system to improve capacity and reduce interference which comprises the steps of:

(a) assigning a set of radio frequency carriers to the cell, (b) dynamically varying an operating protocol of at least one of the radio frequency carriers, in response to real time traffic variations, between an analog protocol and a digital protocol, so that at one time said at least one radio frequency carrier operates as an analog carrier and at another time said at least one radio frequency carrier operates as a time division multiplex digital carrier supporting more than a single channel, (c) examining those radio frequency carriers operating as time division multiplex digital carriers to locate carriers supporting the number of channels less than a maximum number of channels supportable on the digital carrier, and (d) moving at least one operating connection from a channel of one digital carrier to a previously vacant channel of another digital carrier.

The same advantage of synchronizing the digital carriers to facilitate intracell handoffs is also an advantage in accordance with this aspect of the invention.

BRIEF DESCRIPTION OF THE DRAWINGS

The present invention will now be further described in the following portions of this specification so as to enable those skilled in the art to make and use the same, wherein:

FIGS. 2 and 3 illustrate distribution of voice traffic among the complement of spectrum space available at a particular base station;

FIGS. 4 and 5 show variations in occupation of digital channels at two different times;

FIGS. 6-8 illustrate the processing which is employed in accordance with one embodiment of the invention to achieve the advantages thereof;

FIG. 10 illustrates an advantage of the invention in increasing capacity by use of dynamic repartitioning of the frequency spectrum.

DETAILED DESCRIPTION OF PREFERRED EMBODIMENTS

Figure 1:
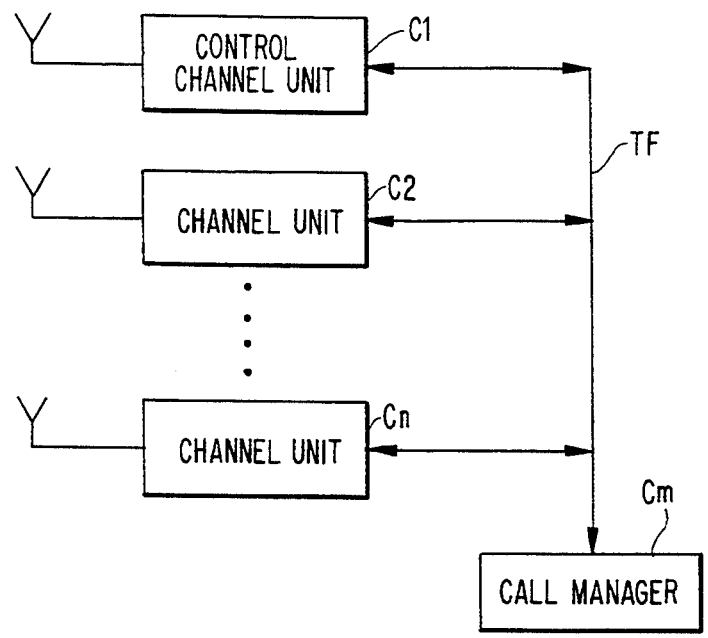
FIG. 1 is a block diagram of the components of a base station and the associated controller.

FIG. 1 shows several of the elements at or controlling the elements of a typical base station covering a cell or a portion of a cell. More particularly, the radio frequency complement includes channel units such as the channel control unit C1, the channel units C2 and Cn. It should be apparent that the number of channel units will depend on the expected maximum traffic for the cell or the portion of the cell to be controlled. Receive and/or transmit radio frequency energy on channels is allocated by the call manager CM which also dictates whether the channel is digital or analog. The channel units can operate either as a channel control unit or a channel traffic unit. As a control unit, the channel unit can either transmit or receive FSK call control data. Voice traffic passes through a channel unit which is not operating as a control channel unit, such as the channel units C2 and Cn illustrated in FIG. 1. Depending on control signals received from the call manager CM, the channel unit can transmit frequency modulated voice traffic to a mobile station (analog carrier). Other channel units can receive frequency modulated voice traffic from a mobile station (analog carrier). Still other channel units will transmit voice information on a time multiplexed channel to a mobile station (digital carrier) and still other channel units can receive time multiplexed voice information from a mobile station (digital carrier).

Figure 2:
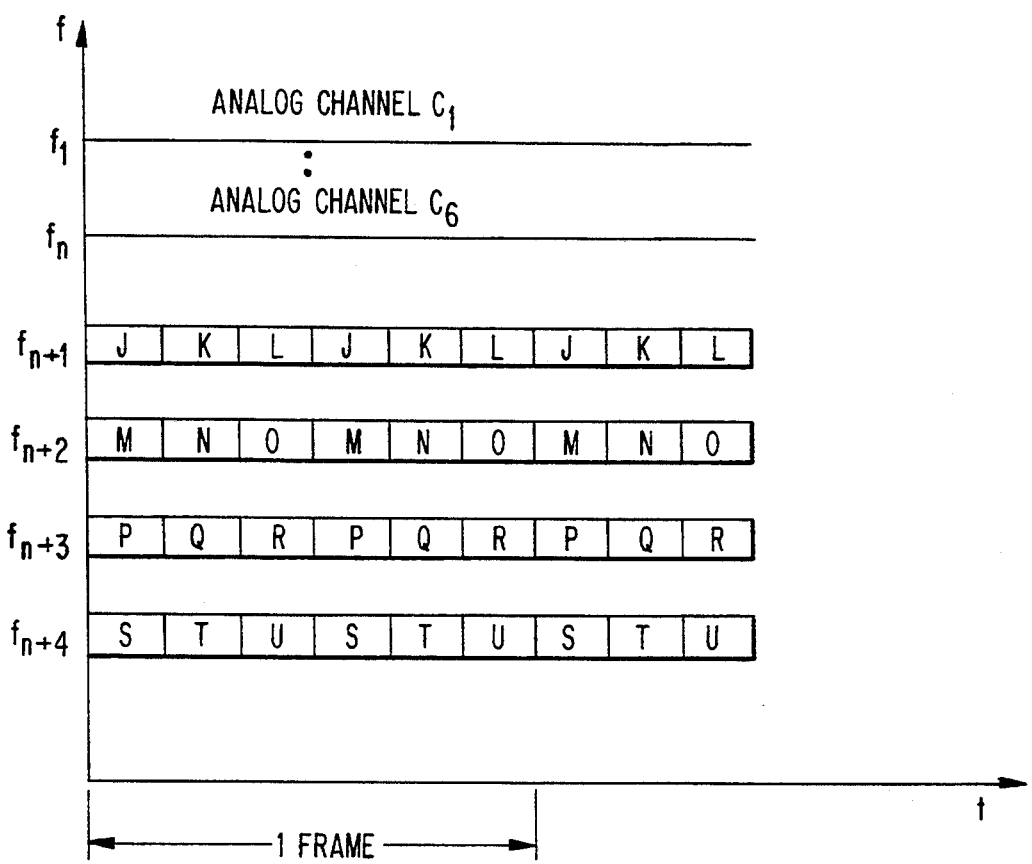

FIG. 2 is useful to illustrate a distribution of channels (either control or voice traffic) at a base station. FIG. 2 shows a plurality of carriers $F_1$ through $F_{n+4}$ (on the vertical axis) against time (on the horizontal axis). As shown in FIG. 2, the base station operates a plurality of analog channel $C_1$ through $C_6$. Inasmuch as the analog channels are not time multiplexed, there is only a single channel per carrier. FIG. 2 also shows a complement ($F_{n+1}$ through $F_{n+4}$) of digital carriers. The digital carriers however are time multiplexed and in the example shown in FIG. 2 there are three channels per carrier corresponding to a full rate coding case for IS-54. As shown in FIG. 2, channels J, K and L are all supported by the digital carrier $F_{n+1}$. Likewise, another carrier supports channels M, N and O, still another carrier supports channels P, Q and R and a further carrier supports channels S, T and U.

FIG. 3 is an illustration similar to FIG. 2 for the same base station, illustrating the dynamic repartitioning of the frequency spectrum available to the station. As shown in FIG. 3, analog channels $C_1$ through $C_5$ are supported, i.e. analog channel $C_6$ is no longer present. In addition, whereas FIG. 2 showed four digital carriers supporting twelve digital channels, FIG. 3 shows five digital carriers supporting 15 digital channels, i.e. digital channels G, H and I are shown in FIG. 3 whereas those channels are not present in FIG. 2.

It is a feature of the IS-54 standard that while a digital carrier can support three channels, the carrier must be on continuously even if only a single channel is active. In other words, of the 15 digital channels G-U shown in FIG. 3, not all of the channels are necessarily active, in fact, if any one of the three digital channels is active, the carrier must be present throughout the frame. This leads to the possibility that as time progresses, and because of call terminations for example, a digital carrier may be supporting less than its full complement of channels. Furthermore, if there are multiple digital channels supporting less than their full complement of channels, there may be an opportunity for packing the digital channels so as to deactivate or turn off one or more of the digital carriers. FIG. 4 shows three digital carriers $f_i$ through $f_k$ and rather than merely identifying each of the different channels, only active channels are identified. Each connection between a mobile and another station (whether it is mobile or not) requires (at least at some time) a forward and reverse channel. Each active channel, such as $AV_1$ represents one such channel, i.e. either a forward or a reverse channel. Thus as shown in FIG. 4, the carrier $f_i$ supports two active channels $AV_1$ and $AV_2$. The digital carrier $f_j$ supports a single digital channel $AV_3$ and digital carrier $f_k$ supports two further active channels, $AV_4$ and $AV_5$. Those skilled in the art will understand that the carriers $f_i$ through $f_k$ each are theoretically capable of supporting three channels but, at the time shown in FIG. 4, call terminations have left a free channel in the carriers $f_i$ and $f_k$ and two free channels on carrier $f_j$. As has been mentioned previously, the presence of an active carrier causes adjacent and cochannel interference. To the extent that the carrier is supporting traffic on a full complement of channels, that interference is unavoidable. To the extent, however, that the carrier is not carrying traffic to its capacity, the interference may be unnecessary. FIG. 5 shows the portion of the frequency spectrum at the base station illustrated in FIG. 4 wherein now the channel $AV_3$ has been moved from the carrier $f_j$ to the carrier $f_i$. In other words, the operating connection represented by $AV_3$ has been moved from one carrier $f_j$ to the different carrier $f_i$. It should be apparent from FIG. 5 that an opportunity is now present to deactivate the carrier $f_j$ and thus eliminate any interference it may cause. This illustrates an advantage of channel packing. FIGS. 4 and 5 also show that in a preferred embodiment, the complement of digital carriers at a cell site are synchronized, i.e. there are channels on one carrier which are synchronous with channels on another carrier. Those skilled in the art are aware that this relationship may be implemented by deriving the timing for different carriers from a common source. As described, the synchronization of carriers simplifies the intracell handoff which is associated with channel packing.

In prior art cellular telephony, a transfer of a connection from one carrier to another typically occurs at a handoff from one cell or cell region to another cell or cell region. In this case, however, the handoff implied from the transition from FIG. 4 to FIG. 5 is intracell or intracell region. In other words, the connection has been moved from one carrier to another carrier wherein both carriers are within the complement of the equipment supporting the traffic in a single cell or cell region. It should also be apparent from FIG. 5 that now the digital carrier $f_j$ is not carrying any traffic at all. This carrier can, in full compliance with IS-54, be turned off. This leads to a reduction in co- and adjacent-channel interference which otherwise would have been caused by the RF energy represented by the carrier $f_j$.

It should be apparent that the transition from the frequency/channel distribution of FIG. 2 to that of FIG. 3 and/or the transition from the channel frequency distribution of FIG. 4 to that of FIG. 5 will be dictated by the changing mix of offered voice traffic. In other words, if the analog channels $C_1$–$C_6$ continue to be occupied by voice traffic, then the base station could not make the transition from the situation of FIG. 2 to that of FIG. 3 without terminating a call in progress on analog channel $C_6$. However, if the carrier supporting analog channel $C_6$ were not in use, and additional digital voice traffic was offered to the base station, then the transition from FIG. 2 to FIG. 3 would allow the base station to support the offered digital traffic. Inasmuch as FIGS. 4 and 5 distinguish active channels from inactive channels, it is apparent that handing off $AV_3$ from one carrier to another only provides an advantage in order to free up the carrier $f_j$.

Figure 6:
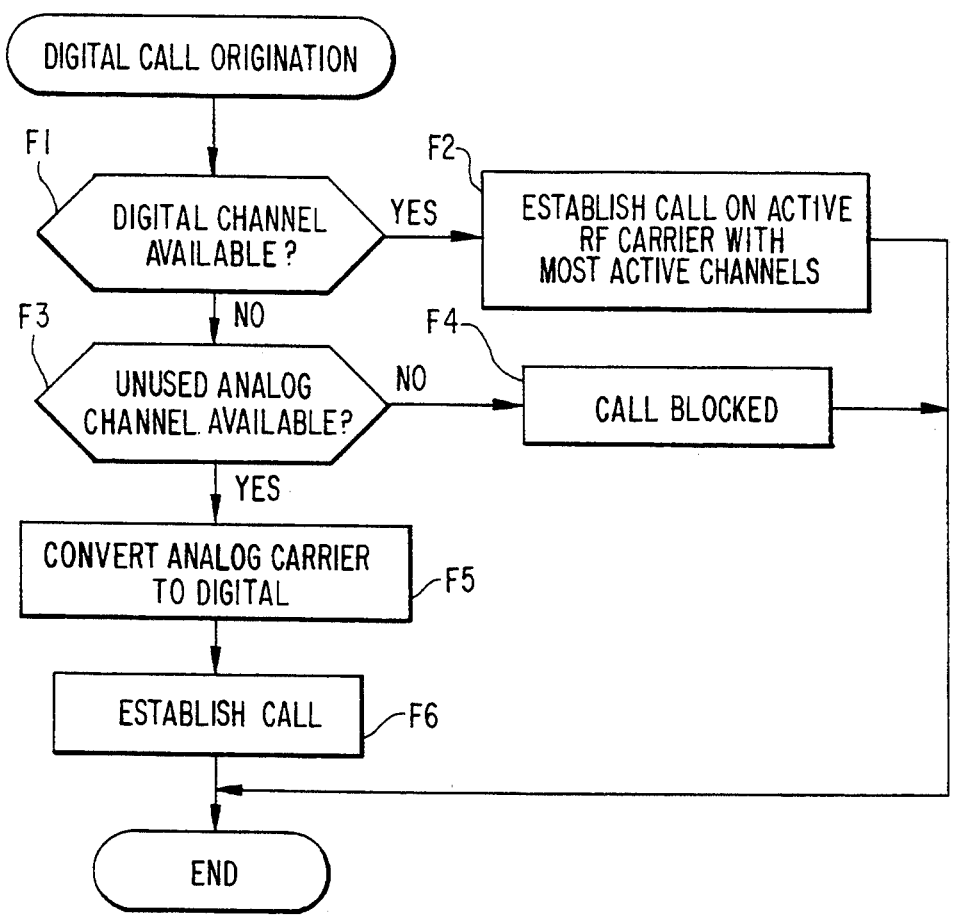
Figure 7:
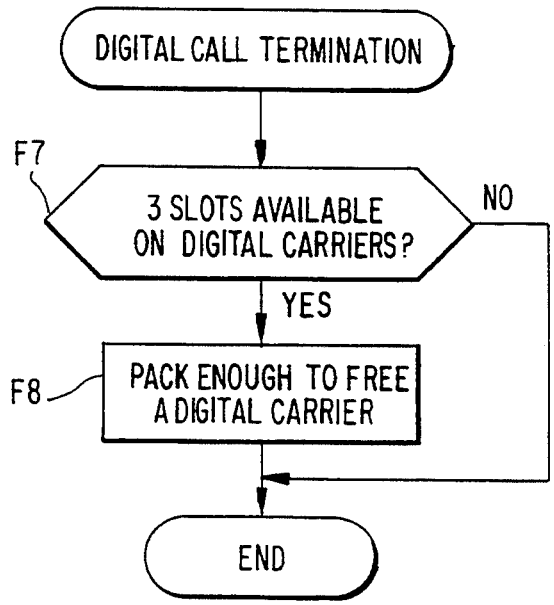

There are many procedures which can be implemented in order to derive the advantages in dynamically allocating voice channels to the frequency spectrum available at the base station. One set of procedures which can be employed is illustrated in FIGS. 6–8. Advantageously, these procedures are triggered by either call originations or terminations, i.e. changes in the offered traffic at the base station. FIG. 6 illustrates a procedure implemented at call origination by a mobile which is capable of interacting with a digital carrier. If the attempted call origination is originated by the mobile, the information transmitted by the mobile during the setup process identifies itself as a mobile capable of interacting with a digital carrier. For other calls, i.e. where the mobile is the call termination, the mobile identification reveals whether or not it can interact with a digital carrier. In any event, when a call attempt is received at the base station which has been identified as a potential digital call, function F1 is performed to determine whether or not any digital channels are available. Referring for example to FIG. 4, it is apparent that there are digital channels available on the carriers $f_i$, $f_j$ and $f_k$. In that circumstance, function F2 is performed to establish the call on an active RF carrier with the most active channels. In other words, an attempt is made by the function F2 to "fill up" the complement of channels supported by a carrier. Thus under these circumstances either the carriers $f_i$ or $f_k$ would be favored over setting up the call in the carrier $f_j$.

On the other hand, if function F1 identified no available digital channels, then functions F3 is performed to determine whether there are any unused analog channels available. If not, function F4 is performed, i.e. the call is blocked. Under those circumstances, processing would be terminated with function F4.

However, if there was an unused analog channel available, function F5 is performed to convert that analog carrier to a digital carrier. Execution of function F5 merely requires transmitting the appropriate control signals to an available channel unit directing it to operate the carrier as a digital channel unit directing it to operate the carrier as a digital carrier, i.e. in a digital format. For example, the channel unit which previously supported $C_6$ (FIG. 2) can be commanded to change its operating mode from analog (FIG. 2) to digital (FIG. 3). The control information to the channel unit would, in that event, of course also identify a particular one of the channels on the carrier for use by the offered call. Thereafter, function F6 would establish the call on the carrier which had been converted from an analog carrier to a digital carrier. The processing shown in FIG. 6 then is the processing that would be employed if for example analog channel $C_6$ (FIG. 2) were unoccupied and none of the channels J through U were available.

The processing shown in FIG. 7 is implemented in the event of a digital call termination. Function F7 determines whether, among the complement of digital carriers, there are three available channels on digital carriers. If there are not, among the complement of carriers supported by the base station, three available channels, then there is no point to repacking the digital channels. However, if there are three channels which are open among the complement of digital carriers, then function F8 is performed to pack enough of the digital channels to free up a digital carrier, in other words, to execute the appropriate number of intracell handoffs to free up an entire digital carrier. In this case, FIGS. 4 and 5 illustrate execution of function F8. In other words, among the three digital carriers shown in FIG. 4, there are four available channels. FIG. 5 shows the situation after execution of function F8, that is, when $AV_3$ has been handed off from the carrier $f_j$ to the carrier $f_i$ to free up the carrier $f_j$.

FIG. 8 shows the processing implemented on the origination of an analog connection. As was the case for FIG. 6, whether the call is mobile originated or not, the information provided to the base station identifies whether or not the mobile can interact with a digital carrier. If it cannot, then that information indicates an analog call origination and the processing shown in FIG. 8 is implemented. Function F9 determines whether there are any analog carriers available. If there are, function F10 is performed to use that carrier to establish the call. On the other hand, function F11 determines if there are any digital carriers available. If there are not, function F12 is performed, i.e. the call is blocked. If there are digital carriers available which are not in use, function F13 is performed to convert a digital channel unit to analog. Again, this merely requires transmitting the appropriate control signals to an available channel unit. Finally, function F14 is performed to use the now converted analog carrier and to establish the call.

The only other offered traffic event is the termination of an analog call. Under the example described herein, no processing related to the repartitioning and/or digital channel packing is triggered by an analog call termination.

Figure 9:
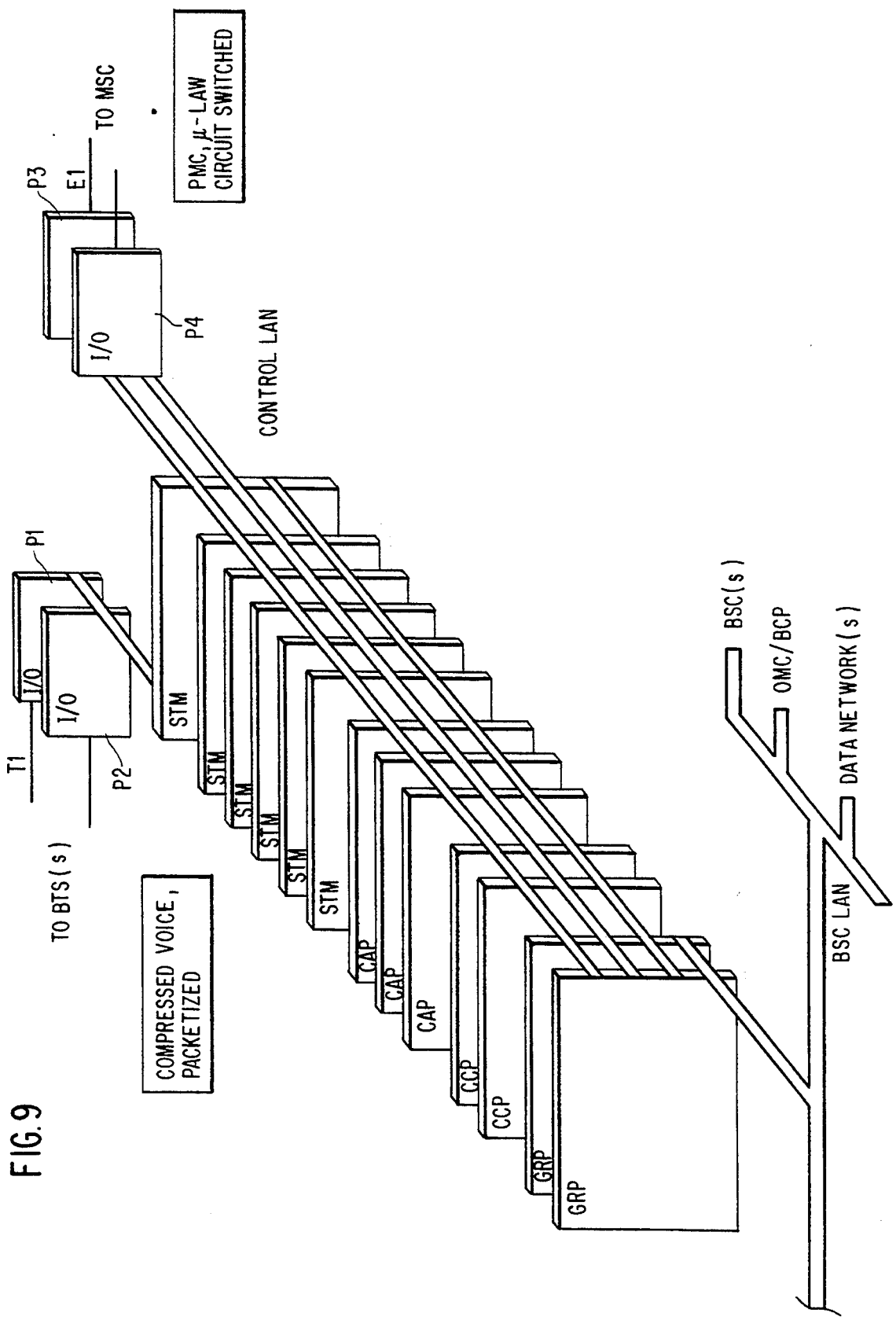
FIG. 9 is a block diagram of a preferred embodiment of the base station controller in accordance with a preferred embodiment of the invention.

FIG. 9 is a block diagram of a base switching control unit which can be employed to implement the present invention. The BSC shown in FIG. 9 includes the call manager function CM shown in FIG. 1. The BSC of FIG. 9 includes I/O cards P1 and P2 supporting the T1 interfacility link TF which is shown in FIG. 1 for carrying traffic and control signals to channel units and traffic and control signals from the channel units. The BSC of FIG. 9 is also coupled through ports supported by the I/O cards P3 and P4 to a Mobile Switching Center (MSC) which in turn is connected to the PSTN. As noted in FIG. 9, voice traffic travelling to and from the cards P1 and P2 is packetized compressed voice, whereas voice traffic travelling to and from the cards P3 and P4 is PCM, mu-law circuit switched, i.e. expanded voice traffic.

The BSC further includes a number of modules interconnected by the buses shown in FIG. 9. These modules includes a Switching Transcoder Module (STM), a Switching Interconnect Module (SIM), a Channel Access Processor (CAP), a Channel Control Processor (CCP) and a Global Resource Processor (GRP). The functions and components of these various modules (other than the SIM module), to the extent not connected with the spectrum repartitioning and digital channel packing described herein are described in applicant's co-pending application Ser. No. 622,232 filed Dec. 6, 1990 and assigned to the assignee of this application (the disclosure of which is incorporated herein by reference). The foregoing application describes and claims an improved implementation of the standard IS-54. It should be emphasized that application of the present invention does not require the use of the improved implementation, although the invention can also be implemented with improved implementation. The SIM is a unit which is described in the co-pending application Ser. No. 870,073 filed Apr. 17, 1992, and assigned to the assignee of this application. SIM is not related to the repartitioning and channel packing described herein.

FIG. 10 is useful for explaining the increase in capacity provided by application of the dynamic repartitioning of spectrum capacity in accordance with the present invention. FIG. 10 shows capacity for a cellular telephone system employing 200 sectors where each sector is allocated 19 channels. The 19 channels allocated per sector can vary from 19 analog channels (and 0 digital channels) to perhaps 18 digital channels and one analog channel, although FIG. 10 is only drawn to illustrate the variation from 19 analog channels and 0 digital channels to 12 analog channels and 7 digital channels. The illustration of FIG. 10 is based on the requirement of carrying 0.026 Erlangs per subscriber and shows, under those circumstances, the number of subscribers that can be supported by different mixes of analog and digital channels where the partitioning between analog and digital is fixed. Of the two curves shown in FIG. 1, the lower curve (identified as fixed boundary—conventional) shows the capacity for different combinations of analog and digital channels. The upper curve illustrates the capacity for the same mix of channels which has the added feature of being capable of transferring channels between analog and digital. Those skilled in the art will recognize from reviewing FIG. 10 that the repartitioning of bandwidth in accordance with the present invention increases the capacity of the system without changing the number of channels and/or the spectrum which is occupied.

It should be apparent that many changes can be made within the spirit and scope of the invention. For example, some cellular operating techniques mandate the maintenance of a spare channel, either a digital channel or an analog channel in order to control blocking probabilities or call loss due to failed handoff. The processing of FIGS. 6-8 can easily be altered to encompass this characteristic. For example, rather than waiting until there are no unused channels available in either the analog or digital pool before converting, the processing could implement an attempt to convert if there is only a single unused channel (or some small number) available.

We claim:

1. A method of operating a given cell of a cellular telephone system comprising the steps of:
    a) at a first time, establishing for a set of n radio frequency carriers available within the given cell, a first subset n(a1) of carriers operating as analog carriers and a second subset n(d1) of carriers operating as digital carriers, where each digital carrier supports from 1 to x channels on a time multiplexed basis, where
        n(a#) represents a number of analog carriers at a time identified by the index #,
        n(d#) represents a number of digital carriers at a time identified by the index #,
        n represents a number of carriers at the cell,
        n, n(a#) and n(d#) is less than or equal to n, and
        x is an integer greater than or equal to two,
    b) at a second time, later than the first time,
        b1) examining each of the digital carriers to locate those digital carriers supporting less than x channels,
        b2) selecting channels from among a group of the digital carriers located in step b1) and rearranging the selected channels to occupy unused channels of digital carriers located in step b1) which are not within the digital carrier group, and
    c) at a third time, later than the first time, selecting at least one digital carrier supporting no channels and removing said selected digital carrier from the second subset of carriers operating as digital carriers and inserting the removed carrier into the first subset of carriers operating as analog carriers so that the first subset of carriers at the third time n(a3) is greater than the first subset of carriers n(a1) at the first time.

2. A method of operating a cell of a cellular telephone system comprising the steps of:
    a) at a first time, establishing for a set of n radio frequency carriers available within the given cell, a first subset n(a1) of carriers operating as analog carriers and a second subset n(d1) of carriers operating as digital carriers, where each digital carrier supports from 1 to x channels on a time multiplexed basis, where
        n (a#) represents a number of analog carriers at a time identified by the index #,
        n(d#) represents a number of digital carriers at a time identified by the index #,
        n represents a number of carriers at the cell,
        n, n(a#) and n(d#) are each integers,
        a sum of n(a#) and n(d#) is less than or equal to n, and
        x is an integer greater than or equal to two,
    b) at a second time, later than the first time,
        b1) examining each of the digital carriers to locate those digital carriers supporting less than x channels,
        b2) selecting channels from among a group of the digital carriers located in step b1) and rearranging the selected channels to occupy unused channels of digital carriers located in step b1) which are not within the digital carrier group, and c) at a third time, later than the first time, selecting at least one unused analog carrier and removing said selected analog carrier from the first subset of carriers operating as analog carriers and inserting the removed carrier into the second subset of carriers operating as digital carriers so that the second subset of carriers at the third time n(d3) is greater than the number of carriers in the second subset of carriers. n(d1) at the first time.

3. A method as recited in claim 1 or claim 2 which includes the further steps of:

d) for each of the digital carriers which supports at least a single channel, creating a repeating frame structure in which each channel appears as at least one time slot within each frame, with any time slot of a channel distinct from time slots of other channels of that digital carrier, and e) synchronizing the frame structure of each of the digital carriers so that a channel of one digital carrier is synchronous with a channel of some other digital carrier.

4. A method as recited in claim 1 in which said second time is at termination of a digital call and said third time occurs at origination of an analog call.

5. A method as recited in claim 2 in which said second time is at termination of a digital call and said third time occurs at origination of a different digital call.

6. A method of operating a given cell of a cellular telephone system to improve capacity and reduce interference, said method comprising the steps of:

a) assigning a set of radio frequency carriers to the cell, b) dynamically varying an operating protocol of at least one of the radio frequency carriers, in response to real time traffic variations, between an analog protocol and a digital protocol so that at one time said at least one radio frequency carrier operates as an analog carrier and at another time said at least one radio frequency carrier operates as a time division multiplexed digital carrier supporting more than a single channel, c) examining those radio frequency carriers operating as time division multiplexed digital carriers to locate carriers supporting a number of channels less than a maximum number of channels supportable on the digital carrier, and d) moving at least one operating connection from a channel of one digital carrier to a previously vacant channel of another digital carrier.

7. A method as recited in claim 6 which includes the further steps of:

e) channelizing each of the digital carriers by a repeating frame structure which includes plural time slots with a time slot of one channel of a given digital carrier distinct from a time slot of any other channel of the given digital carrier, and f) synchronizing the frames of the digital carriers so that a channel of the given digital carrier is synchronous with a channel of another digital carrier.

8. A method as recited in claim 6 or claim 7 wherein the steps of examining and moving occur at termination of a digital call and the step of dynamically varying an operating protocol transfers a digital carrier to an analog carrier at origination of an analog call.

9. A method as recited in claim 6 or claim 7 wherein the steps of examining and moving occur at termination of a digital call and the step of dynamically varying an operating protocol transfers an analog carrier to a digital carrier at origination of a digital call.

10. In a radio frequency communications system having a plurality of stations, wherein the stations communicate on carrier frequencies using channels assigned from among a plurality of assignable channels, some of the channels having a continuous format requiring an entire carrier frequency and some of the channels having a time division multiple access (TDMA) format requiring a repeating time slot corresponding to a portion of a carrier frequency, a method of reassigning channels among the carrier frequencies comprising:

examining each of the carrier frequencies supporting TDMA channels to locate those carrier frequencies supporting less than a predetermined number of TDMA channels, and reassigning at least one TDMA from at least one of the located carrier frequencies to another of the located carrier frequencies in order to reduce the number of carrier frequencies supporting less than the predetermined number of TDMA channels.

11. A method as recited in claim 10 which includes the further step, before the step of examining, of terminating a TDMA channel and wherein the step of examining excludes the TDMA channel just terminated.

12. A method as recited in claim 10 which includes the further step, before the step of examining, of receiving a call attempt and wherein the step of reassigning includes assigning a channel for the call corresponding to the received call attempt in order to minimize the number of carrier frequencies supporting less than the predetermined number of TDMA channels.

13. A method as recited in claim 12 wherein the step of receiving a call attempt includes receiving a call attempt at a central radio station among the plurality of stations, the call attempt being transmitted from a station other than the central radio station to the central radio station.

14. A method as recited in claim 10 which includes the further step, after the step of reassigning at least one TDMA channel, of identifying carrier frequencies which are not supporting any channels and terminating transmission of such identified carrier frequencies.

15. A method as recited in claim 10 wherein the continuous channels comprise analog radio transmission channels.

16. A method as recited in claim 10 wherein the TDMA channels comprise digital radio transmission channels.

17. A method as recited in claim 10 wherein the system comprises a cellular telephone system having a hand-off protocol for handing stations off from one cell to another cell and wherein the step of reassigning at least one TDMA channel includes applying the hand-off protocol to hand the at least one TDMA channel off from one carrier frequency of a cell to another carrier frequency of the same cell.

18. A method as recited in claim 17 which includes the further step of synchronizing the timing of the repeating time slot of the at least one TDMA channel with the timing of the repeating time slots of the other carrier frequency of the same cell to which the channel is handed off.

19. In a radio frequency communications system having a plurality of stations, wherein the stations communicate on carrier frequencies using channels assigned from among a plurality of assignable channels, some of the channels having a continuous format requiring an entire carrier frequency and some of the channels having a time division multiple access (TDMA) format requiring a repeating time slot corresponding to a portion of a carrier frequency, and wherein the carrier frequencies are assigned to the support of either continuous or TDMA channels, a method of assigning a new channel to a carrier frequency comprising:

receiving a call attempt for signalling a requirement to provide an assignment for a new channel, determining whether the new channel has a continuous format or a TDMA format, if the new channel has a TDMA format, examining the carrier frequencies assigned to TDMA channels to determine whether a TDMA channel is available on the TDMA-assigned carrier frequencies, if no TDMA channel is available, examining the carrier frequencies assigned to continue channels to determine whether a continuous-assigned carrier frequency is available, and if a continuous-assigned carrier frequency is available, reassigning the available continuous-assigned carrier frequency to TDMA channels and assigning the new channel to the reassigned carrier frequency.

20. A method as recited in claim 19 wherein the system comprises a cellular telephone system having a plurality of cells and wherein the step of receiving a call attempt includes receiving a request to hand the new channel off from one cell to another cell.

21. A method as recited in claim 20 wherein the cellular telephone system has a hand-off protocol for handing stations off from one cell to another cell and wherein the step of assigning the new channel includes applying the hand-off protocol to hand the new channel off from the one cell to the other cell.

22. A method as recited in claim 19 wherein the continuous channels comprise analog radio transmission channels.

23. A method as recited in claim 19 wherein the TDMA channels comprise digital radio transmission channels.

24. In a radio frequency communications system having a plurality of stations, wherein the stations communicate on carrier frequencies using channels assigned from among a plurality of assignable channels, some of the channels having a continuous format requiring an entire channel frequency and some of the channels having a time division multiple access (TDMA) format requiring a repeating time slot corresponding to a portion of a carrier frequency, and wherein the carrier frequencies are assigned to the support of either continuous or TDMA channels, a method of assigning a new channel to a carrier frequency comprising:

receiving a call attempt for signalling a requirement to provide an assignment for a new channel, determining whether the new channel has a continuous format of a TDMA format, if the new channel has a continuous format, examining the carrier frequencies assigned to continuous channels to determine whether a continuous channel is available on the continuous-assigned carrier frequencies, if no continuous channel is available, examining the carrier frequencies assigned to TDMA channels to determine whether a TDMA-assigned carrier frequency is available, and if a TDMA-assigned carrier frequency is available, reassigning the available TDMA-assigned carrier frequency to continuous channels and assigning the new channel to the reassigned carrier frequency.

25. A method as recited in claim 24 wherein the system comprises a cellular telephone system having a plurality of cells and wherein the step of receiving a call attempt includes receiving a request to hand the new channel off from one cell to another cell.

26. A method as recited in claim 24 wherein the cellular telephone system has a hand-off protocol for handing stations off from one cell to another cell and wherein the step of assigning the new channel includes applying the hand-off protocol to hand the new channel off from the one cell to the other cell.

27. A method as recited in claim 24 wherein the continuous channels comprise analog radio transmission channels.

28. A method as recited in claim 24 wherein the TDMA channels comprise digital radio transmission channels.

29. A method as recited in claim 24 which includes the further steps, after the step of examining the carrier frequencies assigned to TDMA channels, of:

further examining each of the carrier frequencies assigned to TDMA channels to locate those carrier frequencies supporting less than a predetermined number of TDMA channels, and reassigning TDMA channels from at least one of the located TDMA-assigned carrier frequencies to others of the located TDMA-assigned carrier frequencies in order to render the at least one located TDMA-assigned carrier frequency available, and wherein the step of reassigning the available TDMA-assigned carrier frequency includes reassigning the at least one TDMA-assigned carrier frequency rendered available to continuous channels.

* * * * *